Feb. 7, 1933. O. N. PHILLIPS 1,896,970

GEAR PUMP

Original Filed May 10, 1929

O. N. PHILLIPS
Inventor

By *Snow Co.*
Attorneys.

Patented Feb. 7, 1933

1,896,970

UNITED STATES PATENT OFFICE

ORON N. PHILLIPS, OF REYNOLDS, ILLINOIS

GEAR PUMP

Original application filed May 10, 1929, Serial No. 362,039. Divided and this application filed April 4, 1930.
Serial No. 441,618. Renewed December 3, 1932.

This invention aims to provide a novel gear pump, the construction being such that the pump will have great force, a leakage about the shaft of the pump being prevented.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawing:—

Figure 1 shows in elevation, a pump constructed in accordance with the invention;

Figures 2 and 3 are sections taken respectively on the lines 2—2 and 3—3 of Figure 1;

Figure 1:
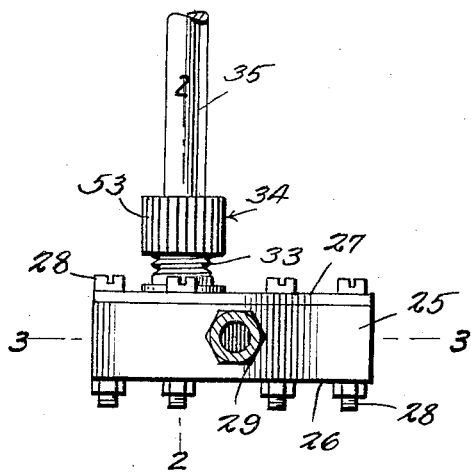

The gear pump forming the subject matter of this application is generally designated by the numeral 5. The pump 5 includes a body 25 having a side wall 26. A cover 27 is attached by securing elements 28 to the body 25, thereby to form a casing. Couplings 29 connect the body 25 with a pipe 4 which delivers and discharges the liquid that is being pumped. The side wall 26 carries a solid shaft 30 and a bearing 31 which is provided at its inner end with a chamber 32 that extends almost all the way through the bearing from end to end. Into the cover 27 is threaded an outstanding bearing 33 with a gland 34 threaded upon it, a shaft 35 being journaled in the bearing 33 and in the gland 34.

A spring tongue 52 is held on the pump casing by one of the securing elements 28 and cooperates with a seat 53 in the gland 34 to hold the gland against rotation and loosening. The shaft 35 can be driven from any accessible part of the engine on an automobile. The shaft 35 has a tubular end 36 receiving and journaled on the hollow bearing 31, there being an external shoulder 37 where the tubular end 36 is joined to the solid part of the shaft. The compression spring 38 is located in the chamber 32 of the bearing 31. Parti-spherical buttons 39 are provided, the buttons having reduced necks 40 received in the ends of the compression spring 38. One button bears against the base of the member 31, and the other button bears against the end of the solid part of the shaft 35 under the action of the spring 39.

Figure 2:
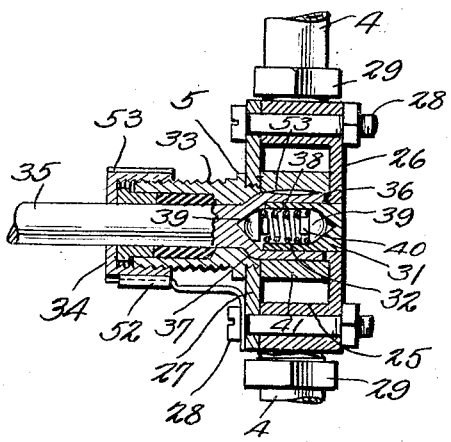

The spring 38, therefore, tends to shove the shaft 35 to the left in Figure 2, and to keep the shoulder 37 of the shaft in hermetic engagement with the inner end of the pump casing. The result of this is that there will be no leakage around the shaft 35, it being practically impossible to keep the gland 34 water-tight when the shaft 35 has to turn as fast as it does in a gear pump.

A gear 41 is secured at 93 to the tubular end 36 of the shaft 35 and meshes with a gear 42 journaled on the stub shaft 30 that is carried by the cover 27. The operation of a gear pump is understood by those skilled in the art, and nothing need be stated on that subject.

Figure 3:
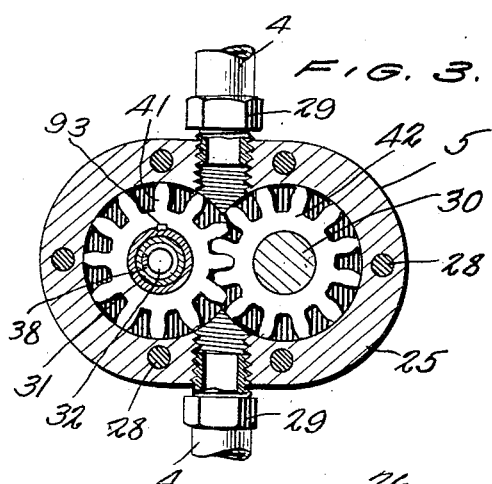
Figure 5:
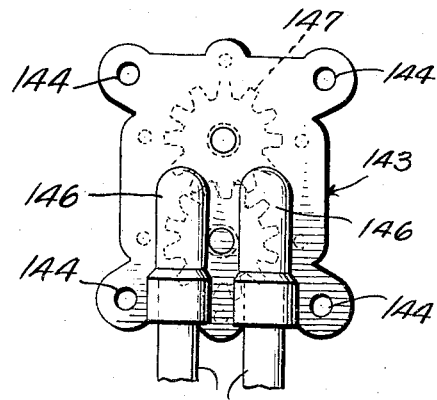
Figure 5 is a plan showing a modification of the pump casing.
Figure 4:
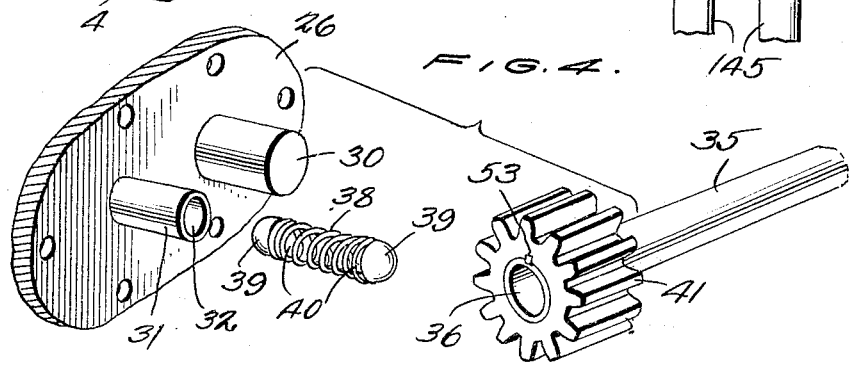
Figure 4 is a composite perspective view showing one of the shafts and parts having to do with the bearings of the shaft.

In the modification shown in Figure 5, the casing 143 of the pump is of approximately rectangular outline, and has attaching openings 144. The pipes 145 correspond to the oppositely disposed portions of the pipe 4 in Figure 3, but are mounted in integral nipples 146 on the side wall of the pump casing. The gears are dotted in at 147.

This application contains matter divided out of my former application No. 362,039, filed on May 10, 1929.

Having thus described the invention, what is claimed is:

A gear pump comprising a single, exposed pump casing having a liquid inlet and a liquid outlet and provided in one side wall with an internal shoulder, intermeshing pump gears in the casing and substantially as wide as the interior of the casing, means for mounting one of said gears for rotation, an inwardly projecting hollow stud fixedly mounted at one end in the opposite side wall of said casing, a one-piece, longitudinally-inextensible operating shaft having an enlarged tubular end receiving and journaled upon the hollow stud with accuracy of workmanship, the shaft extending outwardly through the first-specified side wall of said single casing, the other of the pump gears being secured to the enlarged end of the shaft, the enlarged end of the shaft defining on the shaft, a shoulder shaped to abut tightly against the shoulder of the casing, with accuracy of workmanship, to avoid rattling, and a push spring located within the hollow stud and exerting pressure against the outer end of the stud, and against the end of said one-piece operating shaft, to press the shoulder of the shaft against the shoulder of the casing, and afford a liquid-tight joint at the shoulders, the hollow stud forming a bearing for the shaft and a housing for the spring.

In testimony that I claim the foregoing as my own, I have hereto affixed my signature.

ORON N. PHILLIPS.